(12) United States Patent
Lohmann (10) Patent No.: US 11,581,128 B2
(45) Date of Patent: Feb. 14, 2023

(54) COIL ARRANGEMENT AND WIRELESS POWER TRANSFER SYSTEM COMPRISING A COIL ARRANGEMENT

(71) Applicant: TDK Electronics AG, Munich (DE)

(72) Inventor: Thomas Lohmann, Solothurn (CH)

(73) Assignee: TDK Electronics AG, Munich (DE)

( * ) Notice: Subject to any disclaimer, the term of this patent is extended or adjusted under 35 U.S.C. 154(b) by 255 days.

(21) Appl. No.: 15/733,335

(22) PCT Filed: Jan. 19, 2018

(86) PCT No.: PCT/EP2018/051317
§ 371 (c)(1),
(2) Date: Jun. 29, 2020

(87) PCT Pub. No.: WO2019/141372
PCT Pub. Date: Jul. 25, 2019

(65) Prior Publication Data
US 2020/0357569 A1  Nov. 12, 2020

(51) Int. Cl.
*H01F 27/36* (2006.01)
*H01F 38/14* (2006.01)
*H01F 27/28* (2006.01)
*H01F 27/255* (2006.01)
*H02J 50/10* (2016.01)
*H02J 50/70* (2016.01)
*H01F 3/14* (2006.01)

(52) U.S. Cl.
CPC ........... *H01F 27/36* (2013.01); *H01F 27/255* (2013.01); *H01F 27/28* (2013.01); *H01F 27/366* (2020.08); *H01F 38/14* (2013.01); *H02J 50/10* (2016.02); *H02J 50/70* (2016.02); *H01F 3/14* (2013.01)

(58) Field of Classification Search
CPC ........ H01F 27/36; H01F 27/255; H01F 27/28; H01F 27/366; H01F 38/14; H01F 3/14; H01F 27/2871; H02J 50/10; H02J 50/70; Y02T 10/70; Y02T 10/7072; Y02T 90/14; B60L 53/12
See application file for complete search history.

(56) References Cited

U.S. PATENT DOCUMENTS

| | | | |
|---|---|---|---|
| 2015/0302984 A1* | 10/2015 | Kurs | H01F 27/366 |
| | | | 307/104 |
| 2016/0013661 A1 | 1/2016 | Kurs | |
| 2019/0173317 A1* | 6/2019 | Zaheer | H02J 50/70 |

FOREIGN PATENT DOCUMENTS

| | | | |
|---|---|---|---|
| DE | 20 2013 100530 U1 | | 5/2014 |
| DE | 20213100530 U1 | * | 6/2014 |
| JP | 2013-187378 A | | 9/2013 |

OTHER PUBLICATIONS

International Search Report and Written Opinion in International Application No. PCT/EP2018/051317, dated Aug. 17, 2018 (9 pages).
Japanese Patent Office, Decision of Rejection in Application No. 2020-539065, dated Oct. 5, 2021, in Japanese (6 pages).

* cited by examiner

*Primary Examiner* — Toan T Vu
(74) *Attorney, Agent, or Firm* — Nixon Peabody LLP (57) ABSTRACT

A coil arrangement with reduced core losses is provided. The coil arrangement has a first coil and a second coil and a ferrite layer below the coils. A perpendicular recess in the ferrite layer is provided to reduce magnetic flux density in a center conduction path.

20 Claims, 7 Drawing Sheets

COIL ARRANGEMENT AND WIRELESS POWER TRANSFER SYSTEM COMPRISING A COIL ARRANGEMENT

CROSS-REFERENCE TO RELATED APPLICATIONS

This application is a U.S. National Stage of International Application No. PCT/EP2018/051317, filed Jan. 19, 2018 and published as WO2019/141372 on Jul. 25, 2019, which is hereby incorporated herein by reference in its entirety

FIELD OF THE INVENTION

The present invention refers to coil arrangements, wireless power transfer systems, wireless power reception systems wireless power transfer systems with reduced losses.

BACKGROUND OF THE INVENTION

Coil arrangements can be used to interact with an environment. For example, coil arrangements can be used to send information or energy to an environment or to receive information or energy from an environment utilizing magnetic fields. In wireless power transfer systems a transmission coil arrangement can transmit magnetic energy to a reception coil arrangement to transmit electric power without the need for direct and galvanic connection.

Coil arrangements usually utilize one or more coils arranged in a vicinity of a ferrite material to route the corresponding magnetic flux. However, known coil arrangements suffer due to core losses, i.e. dissipation of energy in ferrite material that establishes a magnetic core. Further, often a meaningful application of coil arrangements suffers due to a changing coupling factor and/or a changing coil inductance when the coil arrangement's environment changes. Changing coupling factors and changing coil inductances negatively influence the resonance circuit that may be electrically connected to the coil arrangement. Further, elaborate means for adjusting a desired inductance value of the coil arrangement are needed.

It is known to increase the amount of ferrite material in the vicinity of the coil arrangement to increase the mass of the magnetic core to reduce losses.

However, then the needed amount of ferrite material and the weight is increased and production costs are raised. Further, design parameters, in particular when miniaturization is designed, are negatively affected.

Consequently, it is desired to have lightweight coil arrangements with reduced core losses, improved stability of the coupling factor and a reduced variation of coil inductance while maintaining a high degree of freedom in designing corresponding devices while maintaining low manufacturing costs.

SUMMARY OF THE INVENTION

To that end, a coil arrangement that may be utilized in wireless power transfer systems, in wireless power reception systems and in wireless power transfer systems according to independent claim 1 is provided. Dependent claims provide preferred embodiments.

The coil arrangement comprises a first coil arranged in an x-y plane, a second coil arranged in the x-y plane next to the first coil, a ferrite layer comprising a ferrite material below the first coil and the second coil. Further, the coil arrangement has a center conduction path arranged between the center of the first coil and the center of the second coil. The center conduction path is a conduction path for magnetic flux. Further, the coil arrangement has a first side conduction path for magnetic flux and a second side conduction path for magnetic flux. Further, the coil arrangement has a perpendicular recess in the ferrite layer.

The first coil and the second coil are electrically connected such that their directions of polarization—when activated—are anti-parallel. The center conduction path is arranged between the first and the second side conduction paths. The perpendicular recess in the ferrite layer is arranged in a vertical position to reduce magnetic flux density in the center conduction path. The perpendicular recess in the ferrite layer has a longitudinal extension oriented perpendicular to a direction of a magnetic field corresponding to the magnetic flux.

It is possible that the recess is limited to the center conduction path only.

Without loss of generality, the plane in which both—series—coils are oriented is denoted the x-y plane. The ferrite layer is arranged in the corresponding z direction below the two coils. The center conduction path and the first and the second side conduction paths establish paths for magnetic flux of the coil arrangement when activated. The center conduction path denotes the space oriented in a horizontal direction between the centers of the coils. The center conduction path is arranged at the position where the magnetic flux density of conventional double coil arrangements reaches relatively high values.

The electrical configuration of the first coil and of the second coil such that anti-parallel polarizations are obtained, establishes what is known as a polarized coil arrangement.

The perpendicular recess preferably is arranged within the area of the center conduction path.

By providing the perpendicular recess in the ferrite layer in the center conduction path, the magnetic behavior of the material in this region is altered. A consequence thereof is that flux density in this region is reduced while flux density in the side conduction paths is increased.

As a result thereof, core losses are reduced. Further, it is possible that dependences of the coupling factor and of the coil inductance on external influences are also reduced.

In contrast to the prior art solution by providing a recess in the ferrite material, the known problems are solved with a reduced need for ferrite material instead of an increased need for ferrite material.

Thus, a solution is proposed that does not only reduce core losses on the costs of an increased amount of needed ferrite material. Core losses are reduced while the dependence on environmental influenced can simultaneously be reduced and the necessity for ferrite material is also reduced. Thus, with respect to previously known coil arrangements the counterintuitive provision of a reduced amount of ferrite material not only solves the problem of core losses but also additional problems.

In ferrite material the loss generation follows the Steinmetz equation:

$$P_v = C_m f^x B_m^y \qquad (1)$$

where $B_m$ is the magnetic flux density and y is the specific coefficient of the ferrite material in use. Usually y is larger than 1. For example for a PC95 ferrite material y is approximately 2.84 at common operation points of temperature, frequency and flux density. So the loss generation will increase by the power of 2.84 while the magnetic flux density is increased. This over-proportional dependence of the loss on the flux density makes it possible to reduce the losses by removing ferrite material at the stated position, although removing ferrite material for reducing core losses is generally known to be counterproductive.

However, it was found that the magnetic flux can be rerouted obtaining the above-cited advantages.

It is to be noted that the term "perpendicular recess" is used as the extension of this recess in the ferrite layer extends perpendicular to the horizontal components of the magnetic field in the respective area.

Further, the properties of the magnetic field are especially relevant in the range between the centers of the coils in the ferrite layer.

It is to be noted that directions denoted as "horizontal" are parallel to the x-y plane. Vertical directions are perpendicular to the x-y plane and parallel or anti-parallel to the corresponding z direction.

It is possible that the coil arrangement further comprises a first parallel recess and a second parallel recess. The first parallel recess is arranged in the ferrite layer. The second parallel recess is also arranged in the ferrite layer. The first parallel recess has a longitudinal extension oriented in a direction parallel to a direction of the magnetic field in the ferrite layer. The first parallel recess is arranged between the first side conduction path and the center conduction path. The second parallel recess has a longitudinal extension oriented in a direction parallel to a direction of the magnetic field in the ferrite layer. The second parallel recess is arranged between the second side conduction path and the center conduction path.

The perpendicular recess, the first parallel recess and the second parallel recess can be structured as elongated structures with a main extension which defines their length and a corresponding lateral extension defining the corresponding width. An extension along the vertical direction is the thickness or depth of the recess.

In certain embodiments the recesses can be regarded as gaps. Then the gaps separate segments of the ferrite material from other segments of the ferrite material.

The depth of the recesses can be smaller than or equal to the thickness of the ferrite layer or of sublayers of the ferrite layer.

The above-described configuration having the parallel recesses establishes configurations where the parallel recesses preferably separate the center conduction path from the side conduction paths.

The side conduction paths are replacement routes for magnetic flux that is expelled from the center conduction path region to reduce the flux density in the center conduction path region. Consequently, when the total area of the side conduction paths and the center conduction path is regarded then a more homogenous flux density distribution is obtained resulting—due to the over-proportional dependence of losses—in an effective loss reduction.

It is possible that one or more parallel recess have along their longitudinal extension a differing width. However, the width can also be constant along their longitudinal extension.

It is possible that the first parallel recess is filled with air or with a material having different magnetic properties than the ferrite material of the ferrite layer. Also it is possible that the second parallel recess is filled with air or with a material having different magnetic properties than the ferrite material of the ferrite layer.

Also it is possible that the perpendicular recess is filled with air or with a material having different magnetic properties than the ferrite material of the ferrite layer.

The recesses can be utilized to reroute portions of the magnetic flux to increase the homogeneity of the magnetic flux density. To that end, the material or air within the recesses is chosen according to their magnetic properties and their ability to efficiently route the flux.

It is possible that the perpendicular recess does not penetrate the first side conduction path and the second side conduction path.

In particular, it is preferred that the perpendicular recess is limited to the center conduction path.

The length of the parallel recesses is generally not limited. However, a limitation of the length of the parallel recesses, e.g. shorter than the extension of the ferrite material in this direction, is possible.

It is possible that the coil arrangement further comprises additional perpendicular recesses arranged in the center conduction path and oriented parallel to the above-mentioned perpendicular recess.

The distribution, the number of additional perpendicular recesses and their dimensions are not limited to specific values. These parameters are preferably chosen according to an optimal routing of the magnetic flux to obtain a maximum homogeneity of the overall magnetic flux density.

It is possible that the ferrite layer has a uniform thickness or that the ferrite layer has a thickness that is greater in a center than in an edge region of the layer.

It was found that routing the magnetic flux density in the ferrite material involves a complex interaction of magnetic field and the matter in the center conduction path. Thus, it was found that providing recesses at specific locations in the center conduction path as well as providing additional ferrite material in the center conduction path, however not in the location of the recesses, can help to further reduce the flux density in the center conduction path although such a measure appears counterintuitive at first glance.

It is, thus, possible that the ferrite layer comprises two or more sublayers. It is possible that the topmost sublayer is solidly filled with ferrite material while sections of sublayers below can be free from ferrite material. Thus, there can be a stepwise construction of sublayers when approaching the center of the center conduction path from a rim-sited location of the ferrite layer.

It is possible that a lateral width of the perpendicular recess is between 0.1 mm and 10 mm.

Further, it is possible that a lateral width of the first and the second parallel recess is between 0.1 mm and 20 mm.

Preferred lateral widths of the perpendicular gap can be 0.1 mm, 0.5 mm, 1 mm, 2 mm, 4 mm, 6 mm and 10 mm.

Preferred widths of the parallel gap can be 2 mm, 5 mm, 10 mm and 20 mm.

The coils can be conventional coils comprising a conducting material of copper, silver, aluminium or alloys thereof. Wires of the coils can be Litz wires comprising a plurality of threads.

It is possible that below the ferrite layer further layers such as shielding layers comprising a metal layer, e.g. comprising aluminium or copper, can be arranged.

It is possible that the length of the perpendicular recess in its longitudinal direction is smaller than or equal to the extension of the ferrite material in the same direction. However, it is preferred that the length of the perpendicular recess in its longitudinal extension equals or is larger than the extension of the center conduction path in this direction.

Further, it is possible that the length of the parallel recesses in their longitudinal direction is smaller than or equal to the extension of the ferrite material in the same direction.

The coil arrangements can be used for wireless power transmission.

Consequently, a wireless power transfer system can comprise such a coil arrangement as described above as a power transmission coil arrangement.

Further, it is possible that a wireless power reception system comprises a coil arrangement as described above as a power reception coil arrangement.

Further, it is possible that a wireless power transfer system comprises a coil arrangement as described above as a power transmission coil arrangement and/or a power reception coil arrangement.

The above-described configurations allow improvements in fringing. Fringing denotes the leaving of the magnetic field, e.g. if the field hits a boundary of the ferrite material. Usually, fringing is associated with an energy loss. By providing the recess which establishes an artificial boundary of the ferrite material fringing is intensified. However, despite an increase in unwanted fringing, the overall performance of the coil system can be improved.

It is possible and preferred that one or more or all parallel recesses reach from one side of the ferrite layer to the other side of the ferrite layer. However, the width of the parallel recesses can vary along their extension. It is possible that the width is smaller in the center of the ferrite layer, e.g. in the center conduction path.

Parallel recesses crossing the center of the ferrite layer can divide the center conduction path into two or more segments.

Central aspects of the coil arrangement, details of embodiments and preferred configurations are described in the accompanying schematic figures.

DETAILED DESCRIPTION OF THE DRAWINGS

Figure 1:
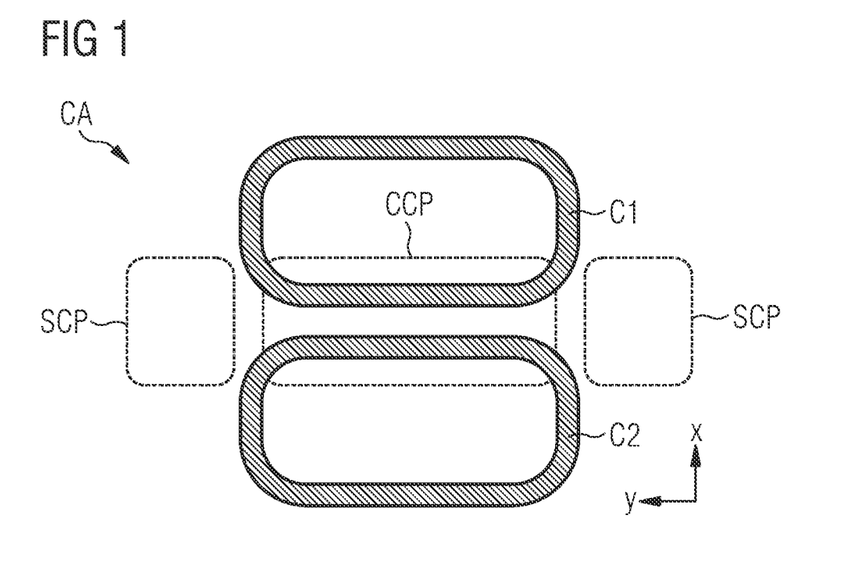
FIG. 1 shows a possible configuration and relative orientation of the paths and the coils.

FIG. 1 shows a first coil C1 and a second coil C2 arranged in the x-y plane to establish a coil arrangement (CA), in particular a polarized coil arrangement. Arranged at a position between the center of the coils, the area of a center conduction path CCP is located. The center conduction path CCP is arranged in a plane parallel to the x-y plane between a first side conduction path SCP and a second side conduction path. The direction from the center of the first coil towards the center of the second coil is perpendicular to the direction of the center of the first side conduction path to the second side conduction path.

With reference to the vertical direction z orthogonal to the x-y plane, the center conduction path CCP and the side conduction paths SCP are mainly arranged below the two coils C1, C2. When conventional polarized coil arrangements are operated, then the flux density in the center conduction path is very high. By routing flux to the side conduction paths the homogeneity is improved.

Figure 2:
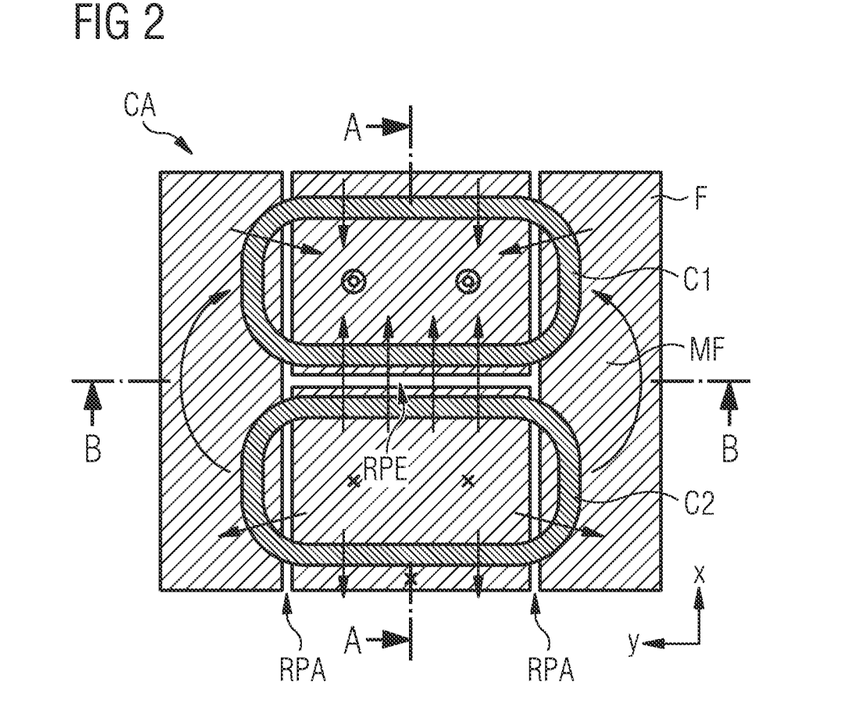
FIG. 2 shows a possible configuration of ferrite material below the coils.

Similar to FIG. 1, FIG. 2 shows a top view onto the x-y plane indicating further possible details. A ferrite material F is arranged in the ferrite layer below the coils. At positions near the center of the respective coils the dotted circuits denote the tips of arrows indicating the direction of magnetic field MF. In areas between the centers of the coils, the magnetic field MF has components parallel to the x-y plane, i.e. horizontal components. In the upper part of the coil arrangement (CA), the horizontal component of the magnetic field may point towards the center of the upper coil. Correspondingly, in a polarized coil arrangement in the lower part shown in FIG. 2, the magnetic field has also a horizontal component pointing towards the center of the lower coil, i.e. antiparallel to the component shown in the upper part of FIG. 2. The magnetic fields of both coils meet at the center between the coils. This is why this region has relatively high magnetic flux densities.

In this region the perpendicular recess RPE in the ferrite material F is arranged. On the left-hand side and, correspondingly, on the right-hand side the parallel recesses RPA are provided in the material F of the ferrite layer. The recesses have an elongated extension along their extension direction. The parallel recesses RPA extend parallel to the horizontal component of the magnetic field MF. The perpendicular recess has a longitudinal extension directing perpendicular to the horizontal component of the magnetic field MF. Lines AA and BB denote the positions of regarded planes in the cross-sectional views of FIGS. 3 and 4, respectively.

Figure 3:
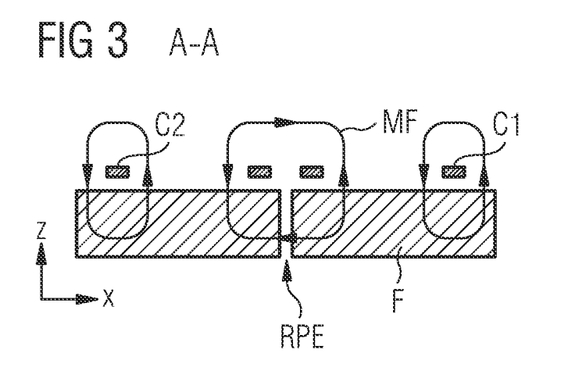
FIG. 3 shows a cross-section including a typical direction of magnetic field.

Thus, FIG. 3 shows a cross-sectional view, i.e. a view of the z-x plane, at position AA denoted in FIG. 2. Usually, the coils are operated at a frequency around 85 kHz. For a regarded time the magnetic fields associated with the first coil C1 and the second coil C2 may be such that the direction of magnetic field in the center of the coils are parallel to the z-direction. Correspondingly, the vertical component of the magnetic fields outside the respective coil is anti-parallel to the z-direction. The magnetic fields accumulate at the position between the coils where the perpendicular gap RPE is provided. By providing the perpendicular gap RPE in this position, the reluctance with respect to the magnetic field in the magnetic core is increased and magnetic flux is transferred along the y-direction towards the side conduction paths to increase the overall homogeneity of magnetic flux.

Figure 4:
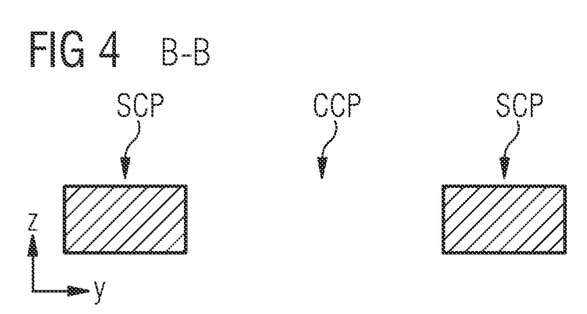
FIG. 4 shows an alternative cross-section and the effect of the parallel recess.

This can be seen in the cross-sectional view across plane BB in FIG. 4 showing a cross-sectional view of onto the z-y plane. In the center portion of FIG. 4—due to the presence of the recess—no ferrite material is present. However, ferrite material remains in the side conduction paths. Due to the presence of the perpendicular recess, the homogeneity of the magnetic field is improved although in the center conduction path the magnetic fields of both coils would accumulate.

Figure 5:
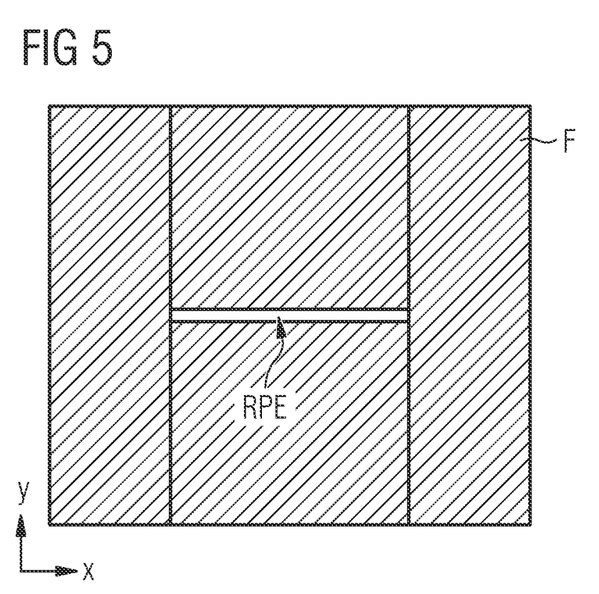
FIG. 5 illustrates a ferrite layer without parallel recesses.

FIG. 5 illustrates a ferrite material F in a ferrite layer with a perpendicular recess but without parallel recesses. However, it is preferred that at least one or more parallel recesses are present.

Figure 6:
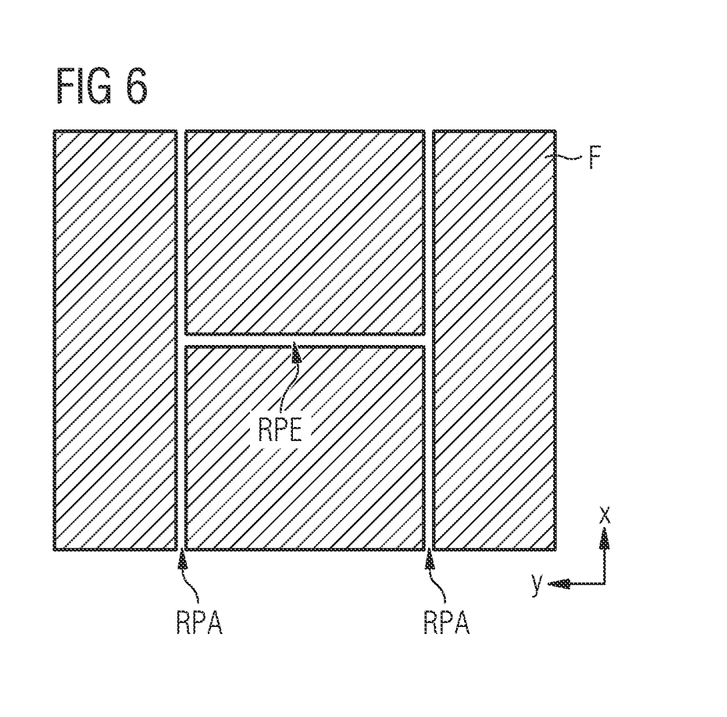
FIG. 6 shows parallel recesses having a different width than the perpendicular recess.

FIG. 6 shows the possibility of parallel recesses RPA and the perpendicular recess RPE having different widths and lengths.

The recesses can be realized as gaps fully separating isolated segments of the ferrite material F.

Figure 7:
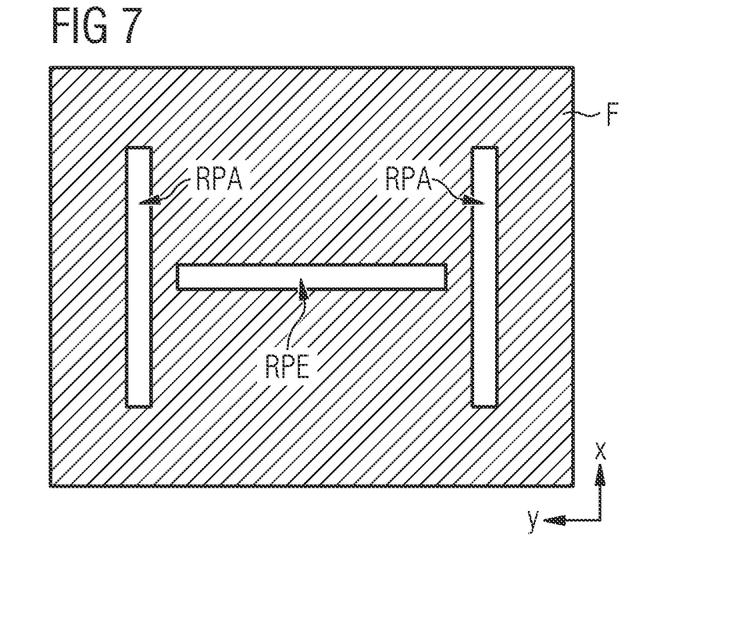
FIG. 7 shows recesses arranged in the ferrite material such that the ferrite material remains a single piece.

In contrast, FIG. 7 shows the possibility of maintaining a single segment of ferrite material F in which recesses are embedded. It is preferred that the extensions of the center conduction path and the perpendicular recess are mainly equal.

Figure 8:
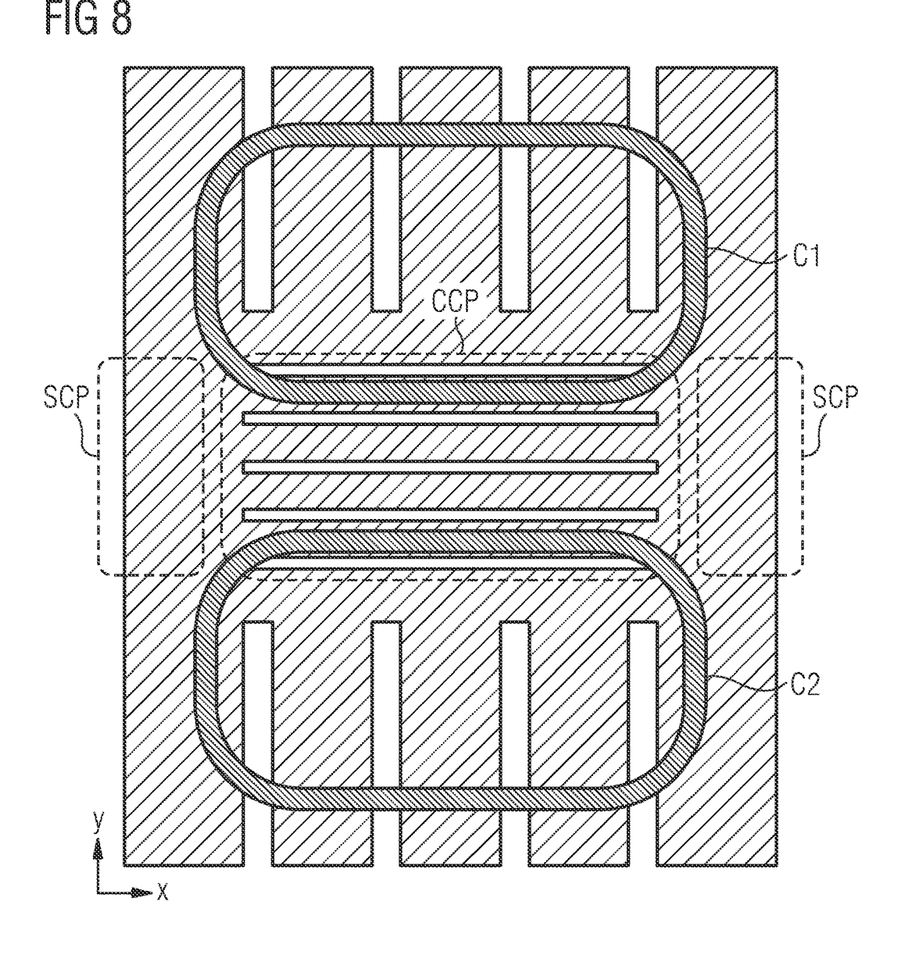
FIG. 8 shows the possibility of providing several recesses.

FIG. 8 illustrates the possibility of having several perpendicular recesses in the center conduction path CCP and several additional recesses that extend in the y-direction but that are separated from the side conduction paths.

Such additional recesses or further additional recesses can be provided to allow electric components such as coils or other circuitry to be contacted with circuitry on the respective other side of the ferrite material.

It is possible and preferred that one or more or all parallel recesses reach from one side of the ferrite layer to the other side of the ferrite layer. However, the width of the parallel recesses can vary along their extension. It is possible that the width is smaller in the center of the ferrite layer, e.g. in the center conduction path.

Distances between the center conduction path and a side conduction path can vary from distances between the center conduction path and other side conduction paths.

It is also preferred that at least one or more recesses completely separates the center conduction path from the side conduction paths.

Figure 9:
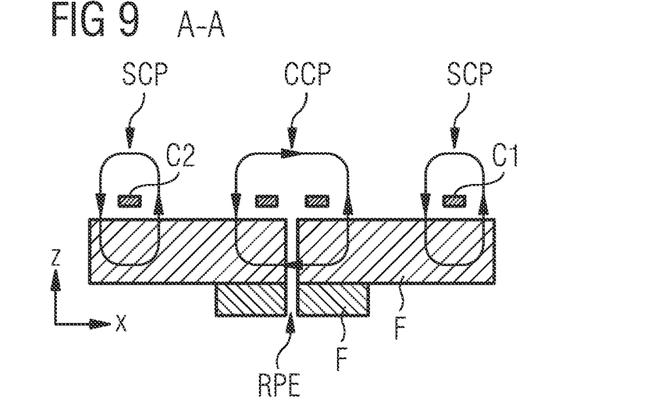
FIG. 9 shows the possibility of providing a ferrite layer consisting of sublayers.

FIG. 9 illustrates the possibility of the ferrite layer consisting of two or more sublayers. The lateral extension within the x-y plane of one sublayer can be different from the lateral extension of another sublayer. Thus, the lower sublayer with respect to the vertical direction z shown in FIG. 9, can have smaller lateral dimensions in the x-y plane than the upper sublayer. In particular, it can be preferred that in the center conduction path, despite the need for the perpendicular recess, additional material F can be useful while in the side conduction paths no additional ferrite material is needed. Thus, by making the thickness of the ferrite layer different for different locations in the x-y plane the overall need of ferrite material is further reduced without the risk of deteriorating the coil arrangements electrical and magnetic properties.

Figure 10:
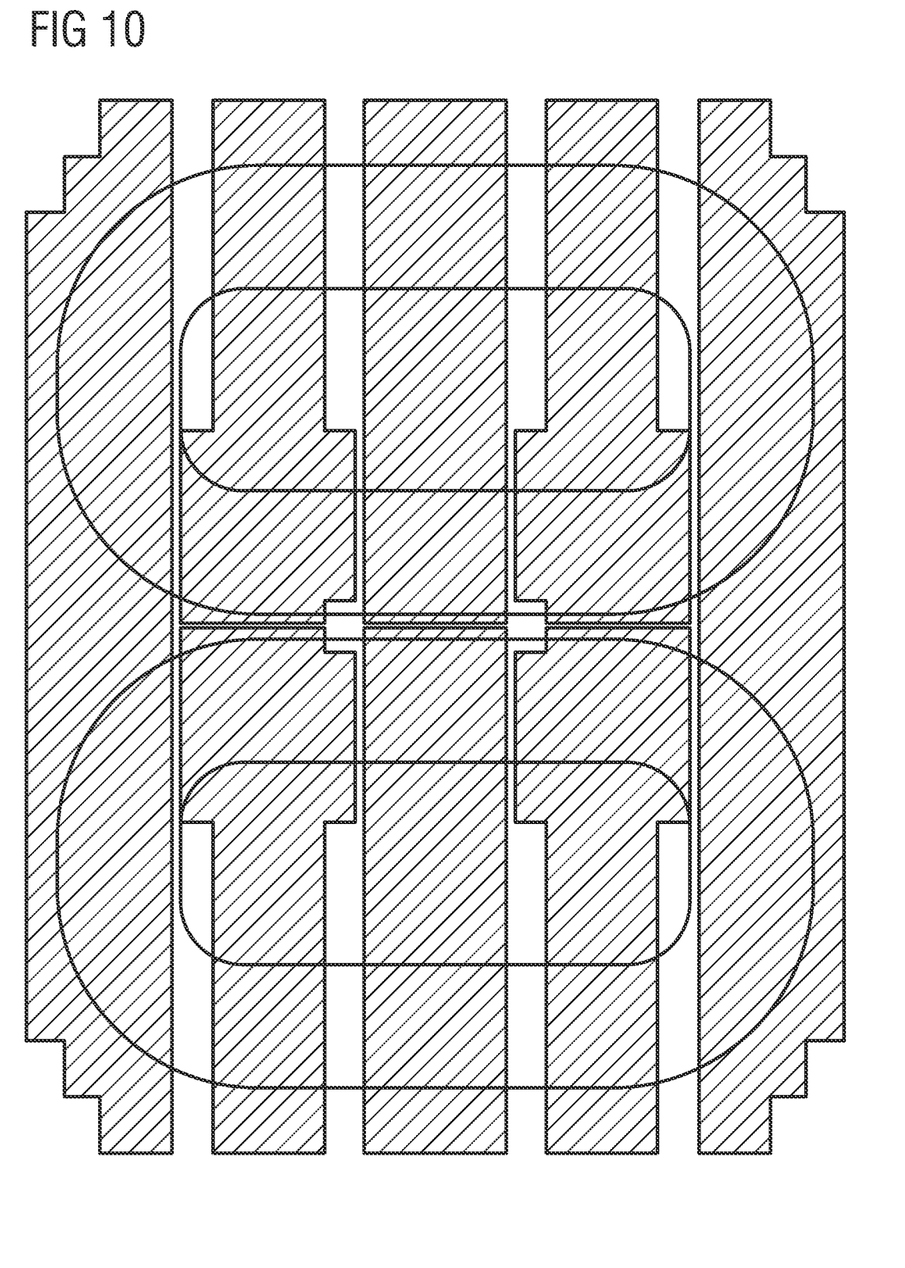
FIG. 10 shows a layout with a divided center conduction path.

FIG. 10 shows a layout of the ferrite layer with parallel recesses dividing the center conduction path into three segments. Between these three segments two additional segments of side conduction paths are arranged and formed by increasing the width of parallel recesses locally.

Figure 11:
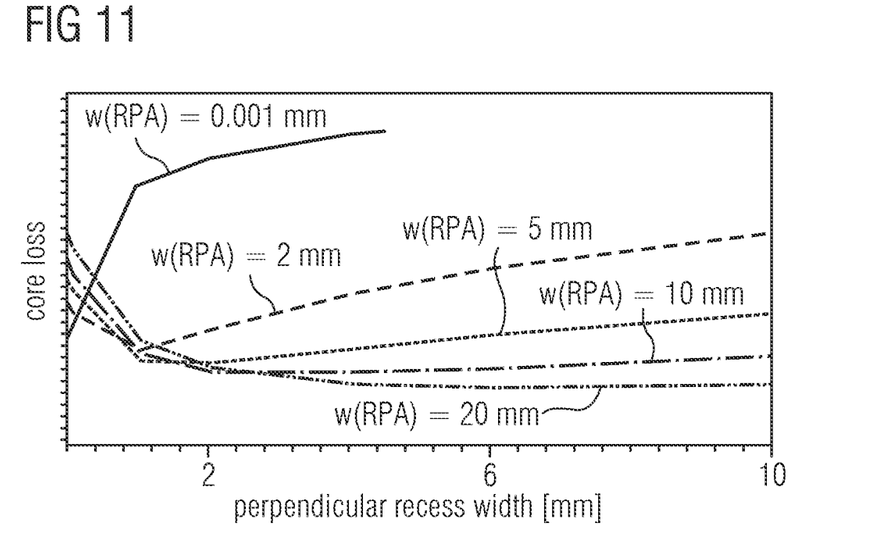
FIG. 11 shows dependencies of core losses on recess widths of a perpendicular recess and of the parallel recesses.

FIG. 11 illustrates the effect of the width of the perpendicular recess and width of parallel recesses on the overall core losses. Thus, the overall core losses can have a minimum for a certain width of the perpendicular recess which may in the range between 0.1 and 10 mm. The shape of the minimum of the core losses, however, and the preferred width of the perpendicular recess can depend on the width of the parallel recesses. In particular for a width of the parallel recesses of 2 mm, a recess width of the perpendicular recess of approximately 1 mm is preferred. For a width of the parallel recesses of approximately 10 mm, a preferred with of the perpendicular recess is approximately 2 mm.

In the coil arrangement to which FIG. 10 refers, the preferred recess width of the perpendicular recess increases with increasing width of the parallel recesses. However, for a width of parallel recesses being 20 mm or more, the core losses are nearly independent of the recess width of the perpendicular recess as long as this width is 6 mm or larger.

Figure 12:
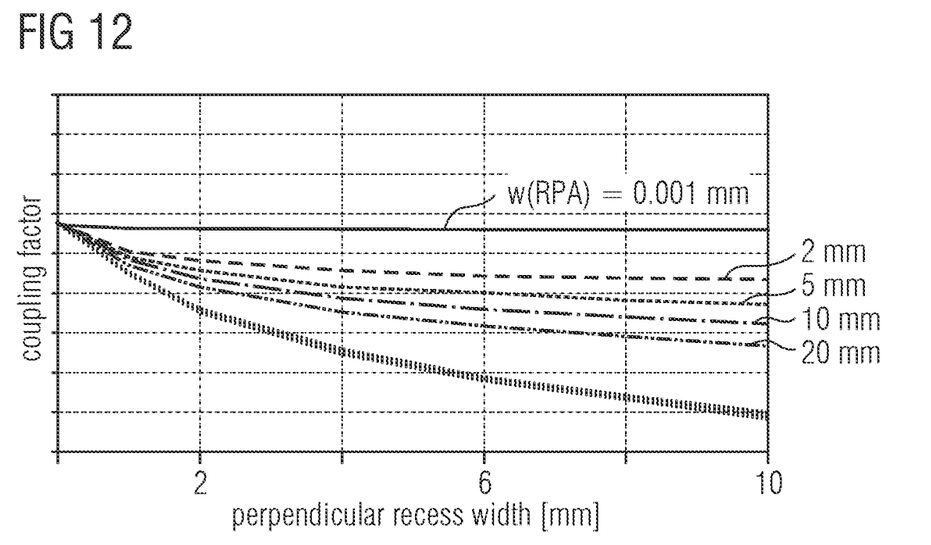
FIG. 12 shows dependencies of the coupling factor on recess widths of the perpendicular recess and the parallel recesses.

FIG. 12 shows the dependence of the coupling factor on the width of the recesses. The top most curves correspond to parallel recesses of a width of 0.001 mm, 2 mm, 5 mm, 10 mm and 20 mm, respectively. The dashed lines show results of additional simulations.

It can be deducted from FIG. 11 that the side conduction paths take a part of the magnetic flux from the center conduction path. This effect helps maintain the coupling factor.

Thus, by finding suitable geometric parameters of the coil arrangement and recesses in ferrite material of the coil arrangement, core losses can be reduced and values of the coupling factor can be decoupled.

The coil arrangement can further have additional circuit elements such as electrical connections to external circuit environments and between the coils and can have further coils and further structures in the ferrite material.

Figure 13:
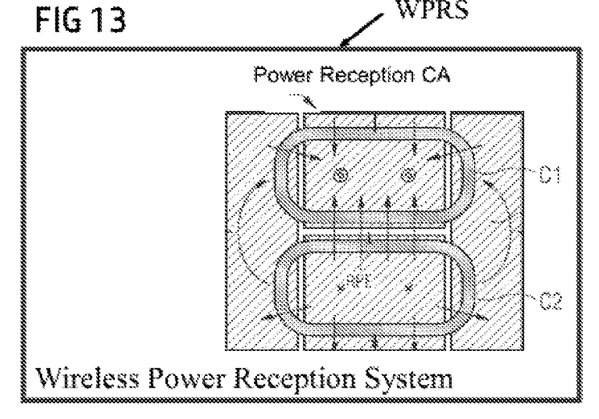
FIG. 13 illustrates a wireless power reception system (WPRS) that includes a power reception coil arrangement (Power Reception CA).

In FIG. 13, a wireless power reception system (WPRS) comprises a coil arrangement as described above as a power reception coil arrangement (Power Reception CA).

Figure 14:
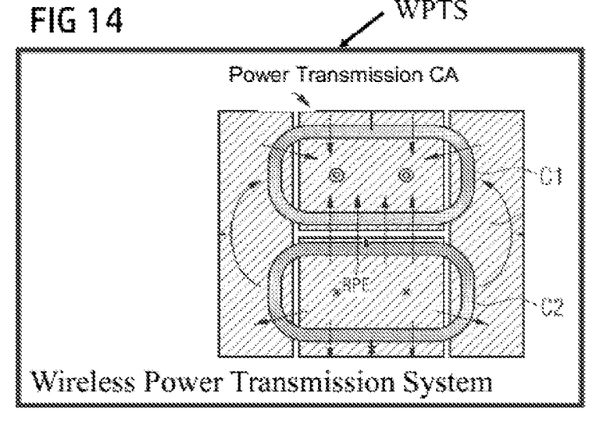
FIG. 14 illustrates a wireless power transmission system (WPTS) that includes a power transmission coil arrangement (Power Transmission CA).

In FIG. 14, a wireless power transfer system (WPTS) comprises a coil arrangement as described above as a power transmission coil arrangement (Power Transmission CA).

Figure 15:
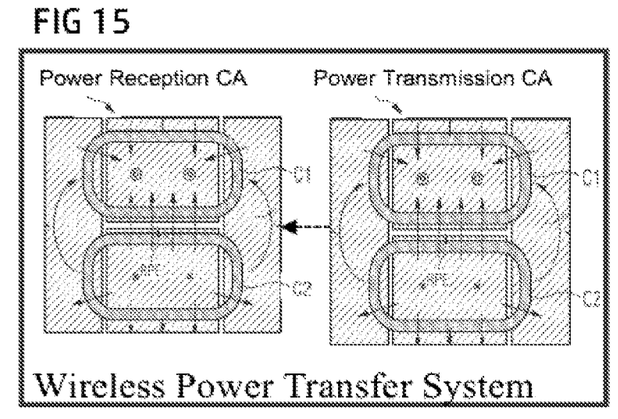
FIG. 15 illustrates a wireless power transfer system that comprises a coil arrangement from the previous embodiments in the form of a power transmission coil arrangement (Power Transmission CA) and/or a power reception coil arrangement (Power Reception CA).

In FIG. 15, a wireless power transfer system may comprise a coil arrangement as described above in the form of a power transmission coil arrangement (Power Transmission CA) and/or a power reception coil arrangement (Power Reception CA).

LIST OF REFERENCE SIGNS

C1: first coil
C2: second coil
CA: coil arrangement
CCP: center conduction path
F: ferrite material in a ferrite layer
MF: direction of magnetic field
RPA: parallel recess
RPE: perpendicular recess
SCP: side conduction path

The invention claimed is:
1. A coil arrangement, comprising
a first coil arranged in a x-y plane;
a second coil arranged in the x-y plane next to the first coil, the first coil and the second coil are electrically connected such that their directions of polarization are anti-parallel;
a ferrite layer comprising a ferrite material below the first coil and the second coil, the ferrite layer having a perpendicular recess;
a center conduction path arranged between a center of the first coil and a center of the second coil for magnetic flux;

a first side conduction path for magnetic flux and a second side conduction path for magnetic flux, the center conduction path being arranged between the first and the second side conduction paths; and wherein the perpendicular recess in the ferrite layer is provided to reduce magnetic flux density in the center conduction path, the perpendicular recess in the ferrite layer has a longitudinal extension that extends in a y-direction of the x-y plane to define a length of the perpendicular recess;

and wherein the ferrite layer includes a first parallel recess and a second parallel recess that are (i) generally parallel to each other and (ii) extend in an x-direction of the x-y plane so as to be generally perpendicular to the perpendicular recess, the first parallel recess being adjacent to the first side conduction path and the second parallel recess being adjacent to the second side conduction path, and wherein the perpendicular recess does not penetrate the first side conduction path and the second side conduction path.

2. The coil arrangement of claim 1, wherein at least one of the first and second parallel recesses has a differing width along a length in the x-direction.

3. The coil arrangement of claim 1, wherein the first and second parallel recesses are filled with a material having different magnetic properties than the ferrite material of the ferrite layer.

4. The coil arrangement of claim 1, wherein the lengths of the first and second parallel recesses in the x-direction are smaller than or equal to the extension of the ferrite material in the same direction.

5. The coil arrangement of claim 1, wherein a lateral width of the perpendicular recess is between 0.1 mm and 10 mm, and a lateral width of each of the first and second parallel recess is between 0.1 mm and 20 mm.

6. The coil arrangement of claim 1, further comprising at least one additional perpendicular recess arranged in the center conduction path and oriented parallel to the perpendicular recess.

7. The coil arrangement of claim 1, wherein the ferrite layer has a uniform thickness.

8. The coil arrangement of claim 1, wherein a lateral width of the perpendicular recess is between 0.1 mm and 10 mm.

9. The coil arrangement of claim 1, wherein the perpendicular recess is filled with a material having different magnetic properties than the ferrite material of the ferrite layer.

10. The coil arrangement of claim 1, wherein the length of the perpendicular recess in its longitudinal direction is smaller than or equal to the extension of the ferrite material in the same direction.

11. A wireless power transmission system comprising the coil arrangement of claim 1 as a power transmission coil arrangement.

12. A wireless power reception system comprising the coil arrangement of claim 1 as a power reception coil arrangement.

13. A wireless power transfer system comprising the coil arrangement of claim 1 as a power transmission and/or a power reception coil arrangement.

14. The coil arrangement of claim 1, wherein the ferrite layer has a variable thickness in the X-Y plane, the thickness being greater in a center region than in an edge region of the layer.

15. The coil arrangement of claim 10, wherein a lateral width of the perpendicular recess is between 0.1 mm and 10 mm, and a lateral width of each of the first and second parallel recess is between 0.1 mm and 20 mm.

16. The coil arrangement of claim 10, further comprising at least one additional perpendicular recess arranged in the center conduction path and oriented parallel to the perpendicular recess.

17. The coil arrangement of claim 10, wherein the first and second parallel recesses are filled with a material having different magnetic properties than the ferrite material of the ferrite layer.

18. The coil arrangement of claim 1, wherein the perpendicular recess is positioned between the first and second parallel recesses, but does not intersect the first and second parallel recesses.

19. The coil arrangement of claim 1, wherein the perpendicular recess is positioned between the first and second parallel recesses, and intersects the first and second parallel recesses.

20. The coil arrangement of claim 1, further including at least one additional parallel recess that is parallel to and positioned between the first and second parallel recesses.

* * * * *